(12) United States Patent
Damm et al.

(10) Patent No.: US 10,007,624 B2
(45) Date of Patent: Jun. 26, 2018

(54) ELECTRONIC DEVICE FOR BLOCKING INTERRUPT REQUESTS

(71) Applicants: Hella KGaA Hueck & Co., Lippstadt (DE); Universität Bielefeld, Bielefeld (DE)

(72) Inventors: Uwe Damm, Dortmund (DE); Marten Vohrmann, Bielefeld (DE); Thorsten Jungeblut, Bielefeld (DE)

(73) Assignees: Hella KGaA Hueck & Co., Lippstadt (DE); Universität Bielefeld, Bielefeld (DE)

( * ) Notice: Subject to any disclaimer, the term of this patent is extended or adjusted under 35 U.S.C. 154(b) by 0 days. days.

(21) Appl. No.: 15/587,955

(22) Filed: May 5, 2017

(65) Prior Publication Data

US 2017/0242808 A1   Aug. 24, 2017

Related U.S. Application Data

(63) Continuation of application No. PCT/EP2015/075632, filed on Nov. 3, 2015.

(30) Foreign Application Priority Data

Nov. 5, 2014   (DE) .................. 10 2014 116 144

(51) Int. Cl.
*G06F 13/24* (2006.01)
*G06F 9/48* (2006.01)

(52) U.S. Cl.
CPC ............ *G06F 13/24* (2013.01); *G06F 9/4812* (2013.01)

(58) Field of Classification Search
CPC ............................... G06F 9/4812; G06F 13/24
See application file for complete search history.

(56) References Cited

U.S. PATENT DOCUMENTS

| | | | |
|---|---|---|---|
| 5,644,772 A | | 7/1997 | Mann |
| 6,061,709 A | * | 5/2000 | Bronte .................. G06F 9/4812 718/102 |
| 2006/0277551 A1 | * | 12/2006 | Accapadi .............. G06F 9/5077 718/107 |
| 2007/0022644 A1 | | 2/2007 | McKenny et al. |

(Continued)

FOREIGN PATENT DOCUMENTS

| | | |
|---|---|---|
| DE | 19700397 C1 | 4/1998 |
| EP | 00679981 B1 | 8/2001 |
| EP | 1836569 A1 | 9/2007 |

OTHER PUBLICATIONS

International Search Report in corresponding International Patent Application No. PCT/EP2015/075632, dated Feb. 1, 2016, with English translation.

*Primary Examiner* — Glenn A Auve
(74) *Attorney, Agent, or Firm* — Edell, Shapiro & Finnan LLC

(57) ABSTRACT

An electronic device comprises one or more control inputs to receive a control signal indicating the beginning of a first critical program section of a program that is running in a system; a counter to be incremented from an initial counter value in response to receipt of the control signal; one or more output signal generators to generate the signal for disabling program interrupts; and an output to output the signal for disabling program interrupts.

6 Claims, 4 Drawing Sheets

(56) References Cited

U.S. PATENT DOCUMENTS

2011/0055183 A1* 3/2011 McKenney ............. G06F 9/526
 707/704
2011/0072180 A1* 3/2011 Lee ......................... G06F 13/24
 710/260

* cited by examiner

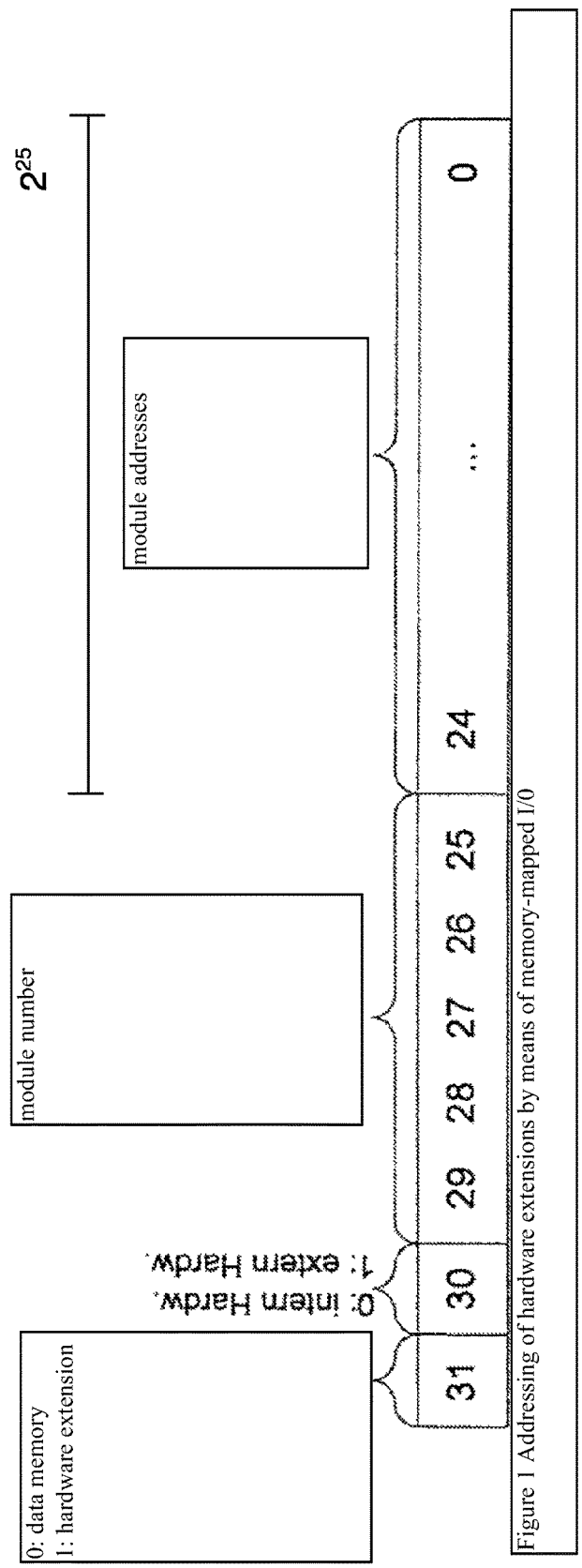

ELECTRONIC DEVICE FOR BLOCKING INTERRUPT REQUESTS

CROSS REFERENCE TO RELATED APPLICATIONS

This application is a continuation of International Application No. PCT/EP2015/075632, filed on Nov. 3, 2015, which claims priority under 35 U.S.C. § 119 to Application No. DE 102014116144.0 filed on Nov. 5, 2014, the entire contents of which are hereby incorporated by reference.

TECHNICAL FIELD

The disclosure relates to an electronic device for generating a signal for disabling program interrupts during a critical program section, a so-called critical section, of a program, running in a system, via so-called interrupt requests, which are called Unterbrechungsforderungen in German.

BACKGROUND

Information processing real-time systems such as, for example, control units in modern motor vehicles, have a plurality of connected sensors and actuators, which are controlled by a microcontroller. For this purpose the microcontroller continuously executes a variety of procedures one after the other in succession. If, however, during the execution of a program there is an external event that requires the immediate execution of another procedure, then the current processing has to be interrupted. This feature is made possible in the case of a microcontroller by so-called interrupts. The interrupt triggers the interrupt of the current procedure and starts processing the external event in another procedure, upon the completion of which the previously interrupted procedure continues.

In systems with real-time requirements, however, the interrupt of critical program sections presents a problem. In order to comply with the time requirements, the interrupts of the current microcontrollers can be enabled or disabled by a configuration register. Before processing a critical program section, the interrupts are disabled by writing to the configuration register. After leaving the critical program section, the interrupts are re-enabled. If a function is called in a critical program section and this function in turn includes a critical program section, then the result is a nested disabling/enabling of interrupts. Studies in the automotive industry have shown that the frequent and nested calling of functions for disabling and enabling of interrupts gives rise to an overhead of up to 15% in the total amount of control software.

SUMMARY

The object of the described device is to reduce the overhead, in particular, the nested calling of functions for disabling and enabling interrupts.

The described device comprises one or more control inputs, an output for outputting an output signal for disabling or enabling program interrupts, one or more output signal generators for generating an output signal and a counter.

A control signal is read into the device via the control input(s), and this control signal indicates the beginning of a first critical program section of the program that is running in the system. If such a signal has been read into the device, then the counter is incremented. Previously, the counter had an initial counter value, for example, zero. In addition, the one output signal generator or a plurality of output signal generators, acting alone or together, is/are used to generate the signal that is intended for disabling the program interrupts and that is outputted at the output.

The control signal, which is read in via the control input(s), may be a command that causes the counter to increment and that causes the one or more output signal generators to generate the signal for disabling the program interrupts. However, the signal could also be the interrupt request itself, which is evaluated by the device.

It is possible in an advantageous way to read via the control input(s) a control signal into the device, wherein this control signal indicates the beginning of an n-th (n is a natural number greater than 1) critical program section of the program that is running in the system. Then on the basis of such a control signal the counter is incremented. Owing to the incrementing of the counter it is possible to carry out the nesting of the calling of the critical program sections. The counter value indicates the degree of nesting, which is also referred to as nestedness in English.

As soon as the end of the n-th critical program section of the program that is running in the system is indicated with a control signal at the control input, the counter can be decremented.

If then a control signal, which indicates the end of the first critical program section of the program that is running in the embedded system, can be read into the device via the control input(s), the counter is decremented to the initial value of the counter. In addition, the one or more output signal generators is/are used to generate the signal for enabling program interrupts; and this signal is outputted at the output. Not until the critical program section, into which the program that is running in the system entered first, has been run through and has ended, were all of the critical program sections, into which the program entered after the beginning of the first program section, left.

The initial value of the counter is preferably set to 0. Then the counter value indicates directly the degree of nestedness.

The described device may comprise a data input and a memory, with which the data, in particular, a data word can be read into the device and can be stored in the memory. Owing to the possibility of storing data, in particular, a data word, it is possible to store a value of a register of the system, for example, a processor status register, in the device. If then this inventive device also has a data output, the data stored in the memory, in particular, the data word stored in the memory, can be transferred to the output. The device is preferably configured in such a way that this step is carried out when the counter has reached the initial counter value. In this way the register content at the beginning of the first critical program section can be transferred back into the system upon completion.

The described device may be an integrated circuit or may be formed by parts of an integrated circuit. The integrated circuit may have, in addition to the inventive device, additional circuit components, for example, at least one processor core.

The one or more output signal generators and/or the memory may contain one or more registers, multiplexers and/or demultiplexers and/or logic gates.

The described device may be a part of a microcontroller or a part of another embedded system (embedded system), which is equipped with a disablement of program interrupts during a critical program section of a program that is running in the microcontroller by interrupt requests.

The microcontroller or the embedded system may include a memory-mapped input/output (memory-mapped I/O, MMIO) and may allow access to the device via a memory access routine, which can be used to access a main memory of the microcontroller.

BRIEF DESCRIPTION OF THE DRAWINGS

The device will be explained below in more detail with reference to the accompanying drawings. In the drawings:

FIG. 4 shows a diagram of a configuration of an address for accessing the memory in a microprocessor.

DETAILED DESCRIPTION

Figure 1:
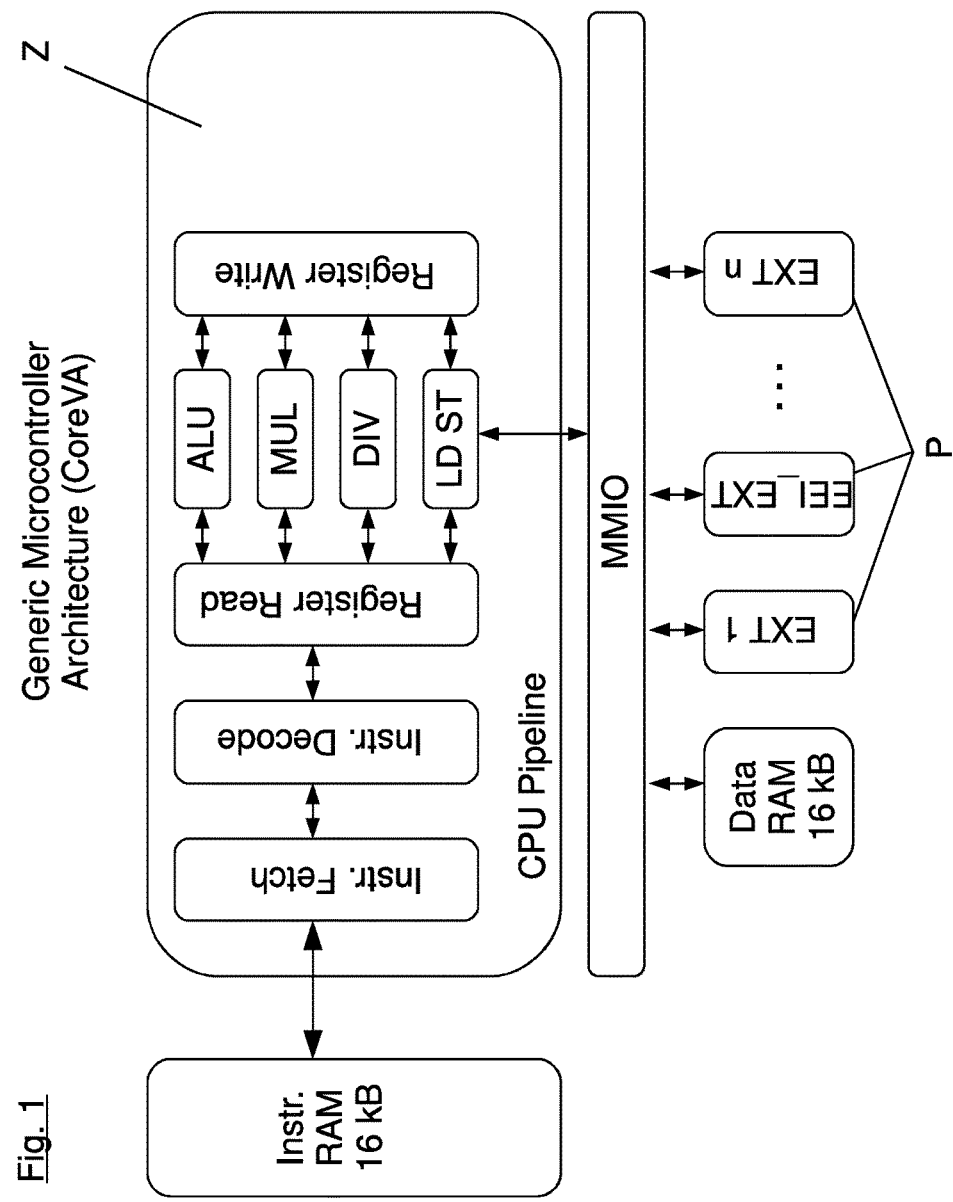
FIG. 1 shows in schematic form a representation of an architecture of an exemplary microcontroller according to the disclosed system.

FIG. 1 shows a well-known architecture of a microcontroller. The microcontroller has a central unit Z and a plurality of peripheral units P as well as a memory, which are labelled Instr. RAM and Data RAM in FIG. 1. The central unit can access the memory Data RAM and the peripheral units P via a memory-mapped input/output MMIO. One of the peripheral units is the inventive device, which is labelled EEI_EXT in FIG. 1.

In principle, however, other architectures of a microcontroller or an embedded system are also conceivable, in which access to the inventive device does not take place via a memory-mapped input/output.

By accessing the inventive device by a memory-mapped input/output, the inventive device can be easily integrated into the architecture of existing microcontrollers. During the memory-mapped input/output the address space of the data memory of the microcontroller is split; and a portion of the address space is used to access peripheral units. As a result, the well-known methods for accessing the memory can also be used to access the peripheral units.

One way to divide the address space of the data memory is shown in FIG. 4 as an example of a generic microcontroller architecture. In this case the most significant bit of the 32-bit address, which is shown merely for illustrative purposes, determines whether the request of the processor core of the microcontroller should be forwarded to the data memory or a peripheral unit. Whether access should to be forwarded to an internal or external peripheral unit is determined by the next highest bit of the address. The following 5 bits address the peripheral unit; the remaining bits of the address may be used to address the data memory or to address components inside a peripheral unit.

An important feature of the inventive device is to provide a dedicated peripheral unit for treating the nested program interrupts in embedded systems, such as, for example, a microcontroller.

Figure 2:
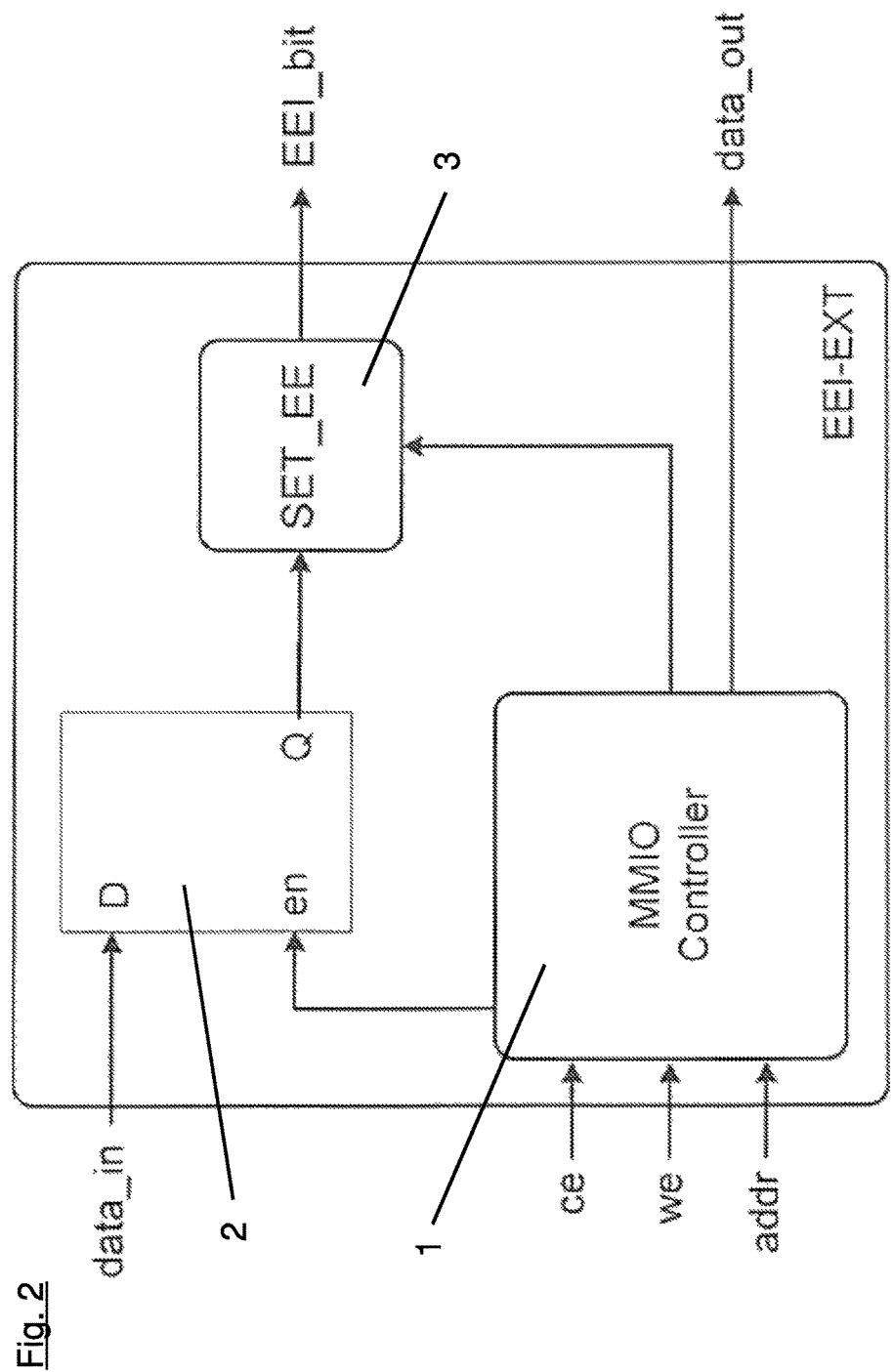
FIG. 2 shows in schematic form a block diagram of an exemplary inventive device of the microcontroller according to FIG. 1.
Figure 3:
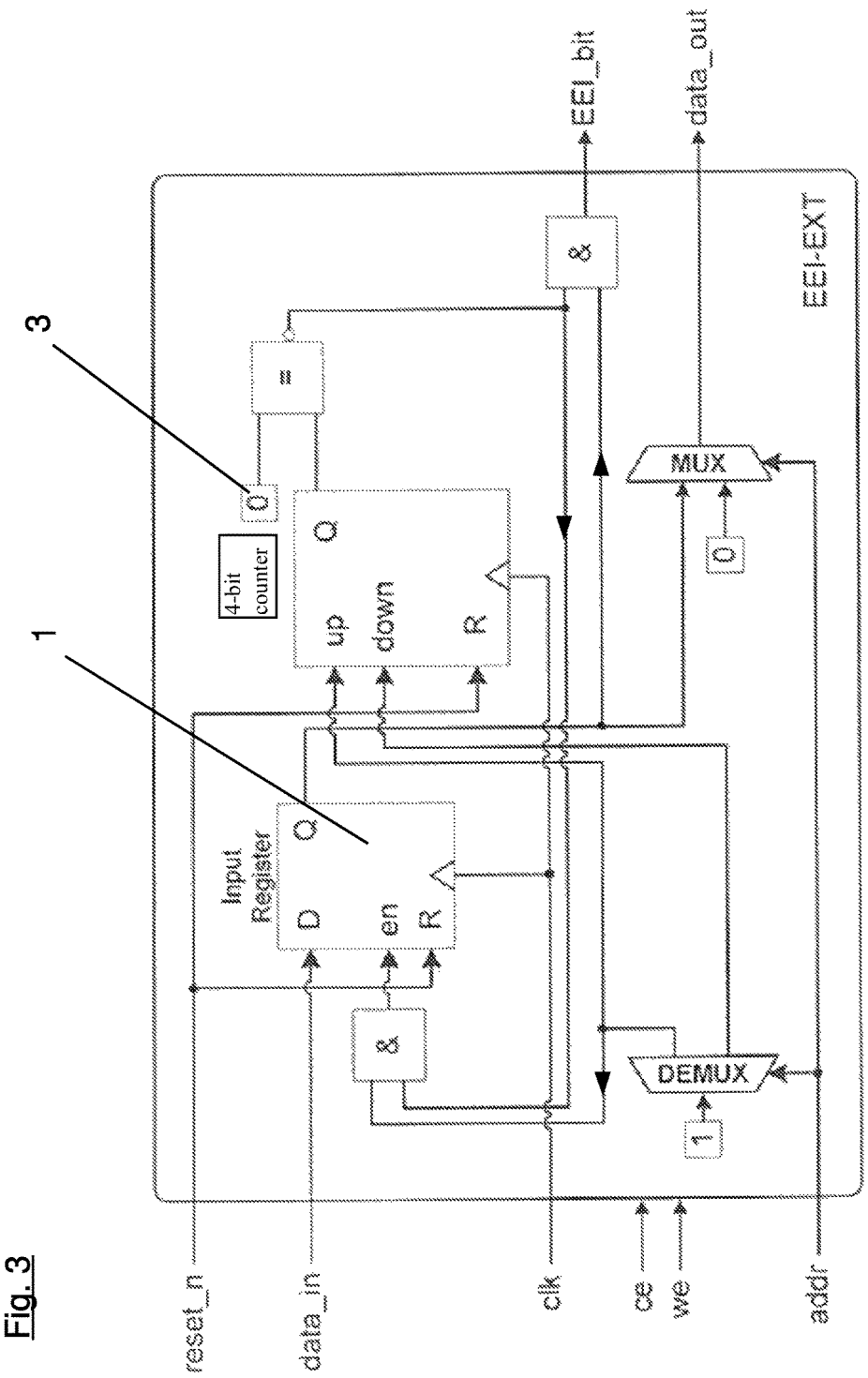
FIG. 3 shows in schematic form a representation of the inventive device according to FIG. 2.

One inventive peripheral unit, as shown in FIGS. 2 and 3, consists in essence of three components, i.e., an input stage 1 with an address decoder for connecting to the rest of the microcontroller, a 32-bit register 2 for storing a status register of the microcontroller, and a digital 4-bit counter 3 for monitoring the levels of nestedness of the critical program sections.

The activation of the components is carried out via the input stage 1, which evaluates the control signals ce (for chip enable), we (write enable) and addr (address). These control signals are part of the address that can be used for addressing the memories and components inside a peripheral unit (see FIG. 4).

While the signal ce enables the input stage, the signal we defines the type of access to the peripheral unit EEI_EXT or, more specifically, the inventive device EEI_EXT. This feature is shown in the following table:

| ce | we | Type of access |
|---|---|---|
| 1 | 0 | read access |
| 1 | 1 | write access |
| 0 | 0 | input stage disabled |
| 0 | 1 | input stage disabled |

During a write access the data are written into the inventive device via a data input data_in. During a read access the data can be read out of the inventive device via the data output data_out. The input signal reset_n is also used to reset the registers and counters of the inventive unit EEI_EXT during a reset operation of the microcontroller.

In the enabled input stage (ce=1) the least significant bit of the applied address determines the action to be performed, as shown in the following table:

| Address | ce | we | Action |
|---|---|---|---|
| 0x88200000 | 1 | 1 | increment counter and write register |
| 0x88200000 | 1 | 0 | read access, register content at the data output |
| 0x88200001 | 1 | 1 | decrement counter |
| 0x88200001 | 1 | 0 | read access, zero at the data output |

In the example that is shown, just two of a total of two high 25 possible addresses are used inside the peripheral unit. This feature makes it possible for the address decoder and, therefore, the functionality of the inventive device to be extended.

The disabling and enabling of the program interrupts take place via the output signal at the output EEI_bit for outputting an output signal for disabling or enabling program interrupts; and the output signal is set by a logic circuit of the inventive device as a function of the level of nestedness, i.e., the counter value of the digital counter and the contents of the input register.

When a critical program section is executed for the first time, it is not only necessary to disable the program interrupts in the described implementation of the device, but it is also necessary to secure the contents of a processor status register of the microcontroller. This step is implemented in the program code by a write access to the address 0x88200000 of the inventive device. According to the second table, the counter is incremented by the value 1 during a write access to this address. The data that are present at the data input data_in are stored in the input register of the device, and at the same time the output signal at the output EEI_bit is set to 1 by the logic of the device. As a result, the program interrupts are disabled. In so doing, the output signal disables the program interrupts via the so-called interrupt controller of the connected microcontroller.

Inside a critical program section of the program executed in the microcontroller, there may be function calls that also contain critical program sections. These critical program sections lead to nesting. The calling of a critical program section results in a write access to the address 0x88200000, in order to disable the program interrupts. The write access results in an incrementing of the counter inside the device and reaches the value 2, when a critical program section of a program that is executed in a microcontroller is called the second time. The state of the output signal at the output EEI_bit is not changed by the renewed instruction to disable the program interrupts. The output signal still has the value 1. Therefore, the program interrupts continue to remain disabled.

In order to be able to restore again the state of the status register, which is stored in the input register of the device, after leaving all of the critical program sections, the input register may not be overwritten during a new write access when entering into a second or higher order critical program section. This feature is ensured by a logic circuit that prevents writing the input register, when the counter value is not equal to zero.

After the instructions of a critical program section have been processed, a write access to the address 0x88200001 takes place in order to leave the critical program section and to enable again the program interrupts. In so doing, the counter is decremented, according to the second table, by the value 1. Since the counter reading had previously the value 2, the output signal at the output EEI_bit is not changed. The program interrupts continue to remain disabled. Not until the last critical program section has been completed (during the last critical program section the counter has the value 1), is the counter decremented by the value 1 by a write access to the address 0x88200001 and reaches a counter value of zero. The result is that the output signal at the output EEI_bit is set to the value 0; and, in so doing, the interrupt controller of the microcontroller is enabled again. During a read access (ce=1 and we=0) to the address 0x88200000 of the device, the data, stored in the input register of the inventive device, are outputted via the data output data_out. During other read accesses the value of zero is outputted to the data output.

What is claimed is:

1. An electronic device for generating a signal for disabling program interrupts during a critical program section of a program running in a system, the electronic device comprising:
   one or more control inputs to receive a control signal indicating the beginning of a first critical program section of the program that is running in the system;
   a counter to be incremented from an initial counter value in response to receipt of the control signal;
   one or more output signal generators to generate the signal for disabling program interrupts; and
   an output to output the signal for disabling program interrupts,
   wherein the one or more control inputs enable a further control signal to be read into the electronic device, the further control signal indicating the beginning of an n-th critical program section of the program that is running in the system, where n is a natural number greater than 1, and wherein receipt of the further control signal causes the counter to be incremented.

2. The electronic device of claim 1, wherein the one or more control inputs enable an end control signal to be read into the electronic device, the end control signal indicating the end of the n-th critical program section of the program that is running in the system, and wherein receipt of the end control signal causes the counter to be decremented.

3. The electronic device of claim 1, wherein the one or more control inputs enable a first end control signal to be read into the electronic device, the first end control signal indicating the end of the first critical program section of the program that is running in the system, and wherein receipt of the first end control signal causes: the counter to be decremented to the initial counter value; a signal for enabling program interrupts to be generated by the one or more output signal generators; and the signal for enabling program interrupts to be outputted at the output.

4. The electronic device of claim 1, further comprising:
   a data input to receive a data word; and
   a memory to store the data word.

5. The electronic device of claim 4, further comprising:
   a data output to receive the data word stored in the memory in response to the counter reaching the initial counter value.

6. A microcontroller with a disablement of program interrupts during a critical program section of a program that is running in the microcontroller, the microcontroller comprising:
   a memory-mapped input/output;
   a main memory; and
   an electronic device for generating a signal for disabling the program interrupts during the critical program section of the program, wherein a memory access routine enables access between the electronic device and the main memory, wherein the electronic device comprises:
      one or more control inputs to receive a control signal indicating the beginning of a first critical program section of the program that is running in the system;
      a counter to be incremented from an initial counter value in response to receipt of the control signal;
      one or more output signal generators to generate the signal for disabling program interrupts; and
      an output to output the signal for disabling program interrupts.

* * * * *